United States Patent Office 3,478,027
Patented Nov. 11, 1969

3,478,027
N-TRIHALOMETHYLTHIO-SULPHONIC ACID AMIDES
Wilfried Paulus, Krefeld-Gartenstadt, Engelbert Kuhle, Bergisch Gladbach, Otto Pauli, Krefeld, Klaus Sasse, Cologne-Stammheim, and Erich Klauke, Cologne-Flittard, Germany, assignors to Farbenfabriken Bayer Aktiengesellschaft, Leverkusen, Germany, a corporation of Germany
No Drawing. Filed Jan. 23, 1967, Ser. No. 610,823
Claims priority, application Germany, Feb. 12, 1966,
F 48,415
Int. Cl. C07d 51/78
U.S. Cl. 260—250                                  5 Claims

ABSTRACT OF THE DISCLOSURE

N-trihalomethylthio-sulfonic acid amide of 2,3-dichloroquinoxaline and a process for the production thereof by contacting a corresponding 2,3-dichloro-quinoxaline sulfonic acid amide with trihalomethane-sulfenic acid chloride at a temperature of about 20–40° C. and in the presence of an acid binding agent.

---

The present invention relates to new N-trihalomethylthio-sulphonic acid amides; more particularly it concerns N-trihalomethylthio-sulphonic acid amides of the formula

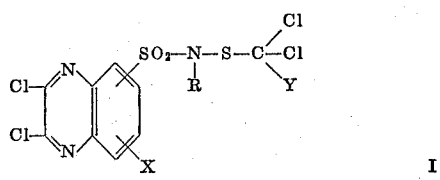

wherein R stands for an alkyl radical, preferably an alkyl radical with 1 to 4 carbon atoms, for a cycloaklyl or alkenyl radical, or for an aryl radical which may be substituted by chlorine, alkyl radicals or nitro groups, X is hydrogen, chlorine or a lower alkyl radical and Y stands for chlorine or fluorine.

Furthermore the invention concerns a process for the production of the new N-trihalomethylthio-sulphonic acid amides of the Formula I; this process consists in that 2,3-dichloro-quinoxaline-sulphonic acid amides of the formula

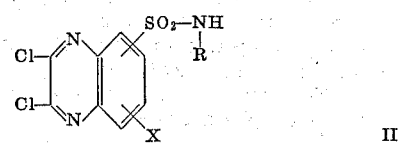

wherein R and X have the same meaning as above, are reacted with trihalomethane-sulphenic acid chlorides of the formula

wherein Y has the same meaning as above.

The reaction of the 2,3-dichloroquinoxaline-sulphonic acid amides of the Formula II with the trihalomethane-sulphenic acid chlorides of the Formula III is expediently carried out in the presence of acid-binding agents, such as caustic soda, sodium carbonate, calcium hydroxide or triethylamine, in an aqueous medium or in a non-aqueous medium, for example, benzene, xylene or dioxan, at 20 to 40° C.

Examples of 2,3-dichloroquinoxaline-sulphonic acid amides of the Formula I are: 2,3-dichloroquinoxaline-6-sulphonic acid methylamide, -butylamide, -allylamide, -anilide, -4-chloroanilide and -4-methylanilide; 2,3-dichloroquinoxaline-5-methyl-6-sulphonic acid methylamide and 2,3-dichloroquinoxaline-5-chloro-6-sulphonic acid methylamide. The trihalomethane-sulphenic acid chlorides of the Formula III are trichloromethane-sulphenic acid chloride and fluorodichloromethane-sulphenic acid chloride.

The 2,3-dichloroquinoxaline-sulphonic acid amides of the Formula I have a remarkable microbicidal action, especially against mould fungi, such as Penicillium glaucum, Rhizopus nigricans, Aspergillus niger and Chaetomium globosum Kunze. With the aid of these compounds it is thus possible to protect a great variety of materials, including in particular, textiles, leather, wood and paper, from attack by mould. If, for example, cellulose-containing textiles are impregnated with solutions of the compounds in organic solvents, such as acetone and glycol monoethyl ether, or with aqueous emulsions of the compounds, and then exposed to the attack of the cellulose-decomposing mould fungus Chaetomium globosum Kunze, the loss in tear resistance is negligible, whereas textiles which have not been impregnated with the compounds completely rot within a few days.

The amounts of 2,3-dichloroquinoxaline-sulphonic acid amides required for the microbicidal impregnation can easily be established for each case by preliminary experiments; in general, amounts of 2%, referred to the weight of the materials to be impregnated, will be sufficient.

It is surprising that the 2,3-dichloroquinoxaline-sulphonic acid amides of the Formula I retain their microbicidal action also if they are chemically linked with cellulose-containing materials. An expedient procedure for this purpose consists in impregnating the materials at normal temperature with an aqueous emulsion which contains, per litre, about 30 g. of the 2,3-dichloroquinoxaline-sulphonic acid amides and about 10 g. sodium carbonate, followed by squeezing, drying at about 70° C., heating at 140° C. for about 10 minutes and finally by rinsing with water. The high resistance to watering exhibited by the materials thus treated is noteworthy.

The following examples serve to illustrate the invention without, however, limiting its scope.

Example 1

A solution of 21 g. N-methyl-2,3-dichloroquinoxaline-6-sulphonic acid amide in 150 ml. dioxan is mixed with 11.4 g. fluoro-dichloromethane-sulphenic acid chloride. 10 millilitres triethylamine are subsequently added dropwise at room tempearture to the mixture and the temperature is allowed to rise to about 40° C. After stirring for a short time, the resultant N-fluoro-dichloromethyl-thio - N - methyl-2,3-dichloroquinoxaline-6-sulphonic acid amide is precipitated with water and filtered off with suction. The yield amounts to 25 g. (melting point 126 to 128° C.).

Example 2

The procedure is the same as that described in Example 1, but with the difference that 12.4 g. trichloromethane-sulphenic acid chloride are used, instead of 11.4 g. fluoro-dichloromethane-sulphenic acid chloride. The N-trichloromethylthio-N-methyl - 2,3 - dichloroquinoxaline-6 - sulphonic acid amide of melting point 137 to 139° C. is thus obtained in a yield of 27 g.

Example 3

A solution of 24 g. N-phenyl-2,3-dichloroquinoxaline-6-sulphonic acid amide in 150 ml. dioxan is mixed first with 11.5 g. fluorodichloromethane-sulphenic acid chloride and then dropwise with 10.2 ml. triethylamine. The temperature rises during this operation to about 35° C. Stirring of the reaction product is continued for some time and the reaction product is then precipitated with water. The yield of the resultant N-fluorodichloro-methylthio-N-phenyl-2,3-dichloro - quinoxaline-6-sulphonic acid amide of melting point 200 to 204° C. amounts to 29 g.

Example 4

The procedure is the same as that described in Example 3, but with the use of 12.5 g. trichloromethane-sulphenic acid chloride, instead of 11.5 g. fluorodichloromethane-sulphenic acid chloride. 32 grams N-trichloromethylthio-N-phenyl - 2,3 - dichloroquinoxaline - 6 - sulphonic acid amide of melting point 212 to 214° C. are then obtained.

The excellent microbicidal finish which can be obtained with the N-trihalo-methylthio-sulphonic acid amides of the present invention on cotton fabrics can be seen from the following table.

Table

Method of treatment: Loss of tear resistance, percent
A _____ <15
B _____ <15

The symbols denote:

Method of treatment A

The fabric was impregnated at room temperature with a 3% solution of the N-trihalo-methylthio-sulphonic acid amide of Example 1 in acetone, then squeezed to a weight increase of 70% and air-dried.

Method of treatment B

The fabric was impregnated at room temperature with the freshly prepared aqueous emulsion described below, which contained 3% of the N-trihalo-methylthio-sulphonic acid amide of Example 1, then squeezed to a weight increase of 70%, dried at 70° C. and heated at 140° C. for 10 minutes. The fabric was subsequently rinsed with water and then watered in a liquor ratio of 1:100 and at 20° C. for 24 hours, changing the water five times every hour. The aqueous emulsion used had been prepared by stirring 15 parts by weight of a concentrate of active compound, which consisted of 20% of the N-trihalo-methylthio-sulphonic acid amide of Example 1, 15% dimethyl formamide, 20% of a commercial emulsifier based on alkylaryl-polyglycol ethers, and 45% xylene, with 84 parts by weight of water with the addition of 1 part by weight sodium carbonate.

We claim:
1. A compound of the formula

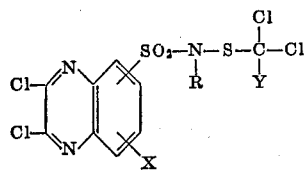

in which

R is an alkyl of 1–4 carbon atoms, lower alkenyl, phenyl or phenyl substituted by a member selected from the group consisting of chloro, alkyl and nitro;
X is a hydrogen, chloro or lower alkyl; and
Y is chloro or fluoro.

2. A process for producing an N-trihalomethylthio-sulphonic acid amide of the formula

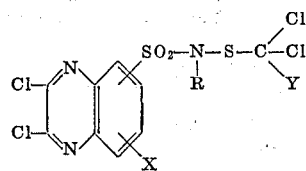

comprising contacting a 2,3-dichloroquinoxaline-sulfonic acid amide of the formula

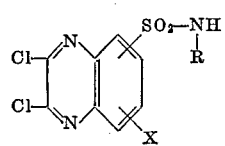

wherein

R is lower alkyl, lower alkenyl, phenyl or phenyl substituted by a member selected from the group consisting of chloro, alkyl and nitro; and
X is hydrogen, chloro or lower alkyl;

with a trihalomethane-sulphenic acid chloride of the formula

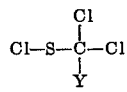

in which

Y is chloro or fluoro effecting the reaction at a temperature of about 20–40° C. in the presence of an acid binding agent.

3. The compound of claim 1 wherein R is methyl, Y is fluoro, and X is hydrogen.

4. The compound of claim 1 wherein R is methyl, Y is chloro, and X is hydrogen.

5. The compound of claim 1 wherein R is phenyl, Y is fluoro, and X is hydrogen.

References Cited

UNITED STATES PATENTS 3,377,336  4/1968  Siegel et al. _____ 260—250
2,553,770  5/1951  Kittelson _____ 260—250

NICHOLAS S. RIZZO, Primary Examiner